United States Patent [19]

Noguchi

[11] Patent Number: 5,535,179
[45] Date of Patent: Jul. 9, 1996

[54] MAGNETO-OPTIC DISC APPARATUS WITH SIGNAL DETECTOR FOR DETECTING RECORDED SIGNALS BASED ON SPLIT BEAMS

[75] Inventor: Masato Noguchi, Tokyo, Japan

[73] Assignee: Asahi Kogaku Kogyo Kabushiki Kaisha, Tokyo, Japan

[21] Appl. No.: 286,197

[22] Filed: Aug. 8, 1994

[30] Foreign Application Priority Data

Aug. 10, 1993 [JP] Japan .................................. 5-198529

[51] Int. Cl.⁶ .............................. G11B 11/00; G11B 7/09
[52] U.S. Cl. ...................... 369/13; 369/44.35; 369/44.25
[58] Field of Search .................................. 369/13, 44.14, 369/44.28, 44.38, 110, 44.35, 44.25, 44.29, 44.41, 44.36, 116; 360/114, 59

[56] References Cited

U.S. PATENT DOCUMENTS

| | | | |
|---|---|---|---|
| 5,150,346 | 9/1992 | Minakuchi | 369/44.36 |
| 5,153,865 | 10/1992 | Minakuchi | 369/44.28 |
| 5,189,650 | 2/1993 | Watanabe et al. | 369/13 |
| 5,208,792 | 5/1993 | Imanaka | 369/44.38 |
| 5,278,401 | 1/1994 | Takishima et al. | 369/44.41 X |
| 5,278,811 | 1/1994 | Chao | 369/18 |
| 5,297,114 | 3/1994 | Itoh et al. | 369/44.32 |
| 5,337,300 | 8/1994 | Takishima et al. | 369/44.41 |
| 5,402,404 | 3/1995 | Saito | 369/44.35 |

FOREIGN PATENT DOCUMENTS 5977649  10/1982  Japan .

Primary Examiner—Ali Neyzari
Attorney, Agent, or Firm—Greenblum & Bernstein

[57] ABSTRACT

In a magneto-optic disc apparatus detecting light is reflected by a recording track of a magneto-optic disc and split into a least two split beams which are received by respective sensors to detect signals recorded on said recording track. A calculator multiplies a predetermined difference signal of a plurality of detection signals outputted from one of the sensors by a predetermined coefficient. Signal detectors detect recorded signals in accordance with the predetermined difference signal which has been multiplied by the coefficient and detection signals of the sensors.

14 Claims, 7 Drawing Sheets

TO TRACKING SIGNAL DETECTING AND
FOCUS SIGNAL DETECTING OPTICAL SYSTEM

MAGNETO-OPTIC DISC APPARATUS WITH SIGNAL DETECTOR FOR DETECTING RECORDED SIGNALS BASED ON SPLIT BEAMS

BACKGROUND OF THE INVENTION

1. Field of the Invention

The present invention relates to a magneto-optic (photomagnetic) disc apparatus.

2. Description of Related Art

In a known magneto-optic (MO) disc apparatus, data recorded on a magneto-optic disc is read using a laser beam. Namely, a reading light (laser beam) is directed incident upon a recording track of the magneto-optic disc, so that light (return light) reflected by the recording track is received by a photosensor. The return light has a polarization direction in accordance with the direction of the magnetically polarized recording track and is thus read as binary signals recorded on the magneto-optic disc.

In such a data reading optical system for known magneto-optic disc apparatus, since the MO signals obtained through the return light reflected from the magneto-optic disc include spurious signals from the tracking surface, crosstalk occurs. There has long been a need to effectively eliminate this crosstalk by a simple mechanism.

To respond to such a requirement, the primary object of the present invention is to provide a magneto-optic disc apparatus in which spurious signals from the tracking surface, that would otherwise mix with the reading signals can be effectively eliminated to thereby reproduce noiseless signals.

SUMMARY OF THE INVENTION

To achieve the object mentioned above, according to a novel philosophy based on the inventor's analysis, there is provided a magneto-optic disc apparatus in which detecting light is reflected by a recording track of a magneto-optic disc and split into at least two split beams which are received by respective sensors to detect signals recorded on the recording track. A split sensor receives one of the split beams and another sensor receives the other split beam. A predetermined difference signal from a plurality of detection signals outputted from the split sensor is multiplied by a predetermined coefficient by calculating means. Then, signal detecting means detects a recorded signal in accordance with the difference signal multiplied by the coefficient and the detection signals of sensor.

According to another aspect of the present invention, there is provided a magneto-optic disc apparatus in which detecting light is reflected by a recording track of a magneto-optic disc and split into at least three split beams which are received by separate sensors to detect signals recorded on the recording track. A 4-way split sensor receives one of the other split beams and an other sensor receives the other split beam. Calculating means multiply a difference signal outputted from the split sensor (the difference signal being a difference between a plurality of detection signals) by a predetermined coefficient. Finally, signal detecting means detecting a recorded signal in accordance with the difference signal which has been multiplied by the coefficient and the detection signals of other sensor.

Assuming that the detection signals of the two sensors are S31 and S33, and the detection signals of the two pairs of the diagonally opposed sensor areas of the 4-way split sensor, are $S37_1$, $S37_2$; and $S37_3$, $S37_4$ (FIGS. 4 and 5), the calculating means calculates an unbalance signal Q in a diagonal direction of the 4-way split sensor in accordance with the following equation:

$$Q=(S37_3+S37_4)-(S37_2+S37_3).$$

Then, the calculating means multiplies the value of Q obtained by a predetermined coefficient k, so that the signal detecting means obtains a recorded signal based on the following equation:

$$(S31-S33)-kQ.$$

The coefficient can be selected such that the detecting light is moved in a transverse direction across more than one track on which no data is recorded, so that an amplitude of the detection signal detected is zero.

In an example, data is recorded on the recording track at a position plus and minus ¼ of the track width perpendicular to the tracking direction from the center of the track (FIG. 2).

According to another aspect of the present invention, there is provided a magneto-optic disc apparatus in which detecting light is reflected by a recording track of a magneto-optic disc and split into at least two split beams which are received by at least two 5-way split sensors by a beam splitter to detect signals recorded on the recording track. Each 5-way split sensor has one center sensor area extending in a track direction corresponding to a tangential direction of the magneto-optic disc and four peripheral sensor areas that are located on the opposed sides of the center sensor area and split by orthogonal axes in a diameter direction and a track direction perpendicular thereto (FIGS. 9 & 10). Calculating means multiply a difference signal outputted from the split sensors (the difference signal being a difference between a plurality of detection signals) by a predetermined coefficient. Finally, signal detecting means detect a recorded signal in accordance with the difference signal which has been multiplied by the coefficient and the detection signals of the sensor.

Assuming that the output signals of the center sensor areas of the two split sensors are $S47_3$, $S49_3$; and the output signals of the peripheral sensor areas of the two split sensors are $S47_1$, $S47_2$, $S47_4$, and $S47_5$; $S49_1$, $S49_2$, $S49_4$, and $S49_{5121}$, respectively, the calculating means calculates an unbalance signal Q in a diagonal direction of the split sensor in accordance with the following equation:

$$Q=(S47_1+S47_5-S47_2-S47_4)-(S49_2+S49_4-S49_1-S49_5).$$

Then, the calculating means calculates recorded signals M in accordance with the following equation:

$$M=(S47_1+S47_2+S47_3+S47_4-S47_5)-(S49_1+S49_2+S49_3+S49_4+S49_5).$$

whereby the signal detecting means obtains a recorded signal based on the following equation:

$$M'=M-kQ.$$

According to still another aspect of the present invention, a magneto-optic disc apparatus detects light reflected by a recording track of a magneto-optic disc and split into at least two split beams received by at least two sensors to detect signals recorded on the recording track in accordance with detection signals of the at least two sensors. Light intercepting members intercept a predetermined quantity of light to be received by light receiving surfaces of the sensors at diagonally opposed portions thereof, and signal detecting means detect a recorded signal in accordance with the detection signals of the sensor.

The present disclosure relates to subject matter contained in Japanese patent application No. 05-198529 (filed on Aug. 10, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
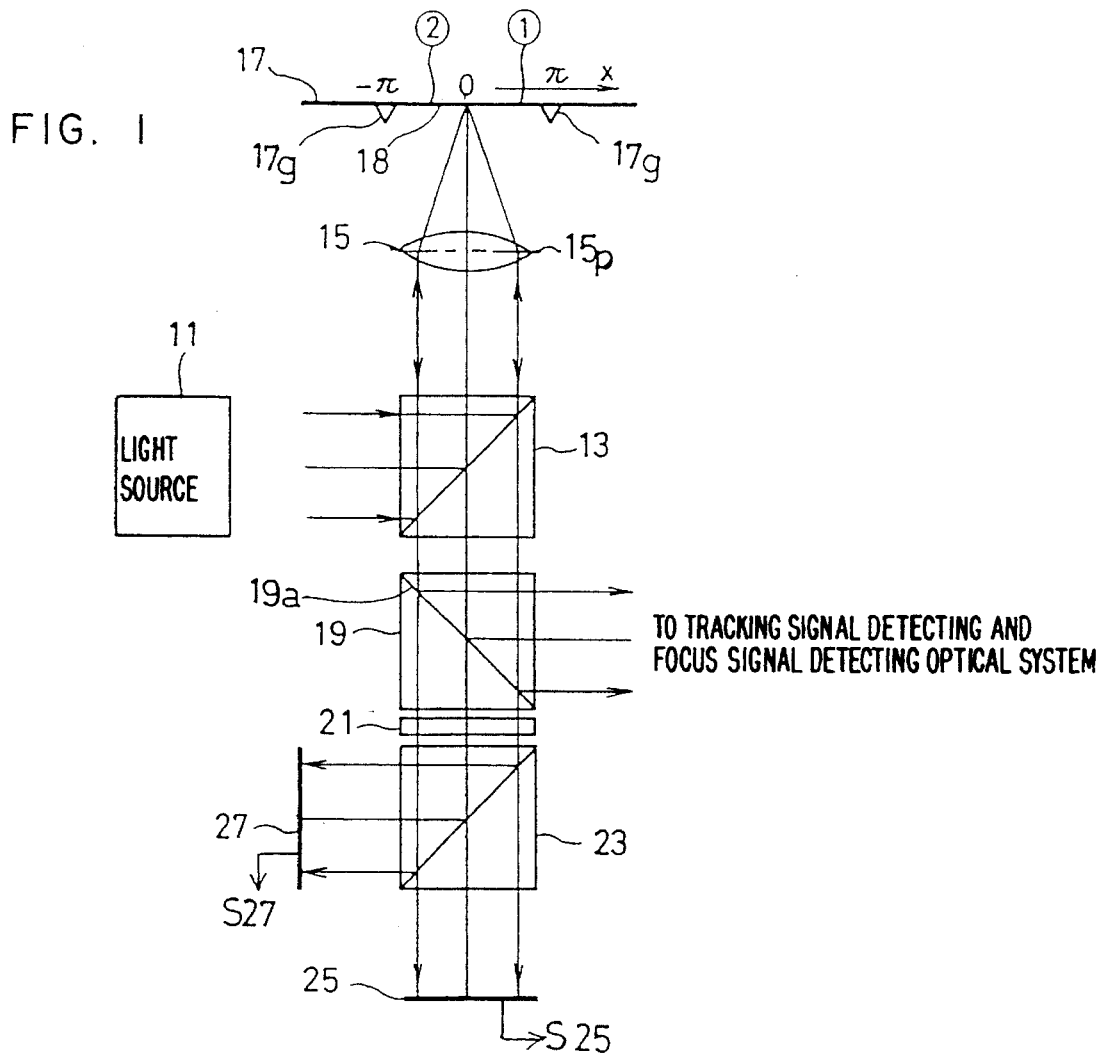
FIG. 1 is a schematic diagram of optical paths in an optical system of a magneto-optic disc apparatus, according to a first embodiment of the present invention.
Figure 2:
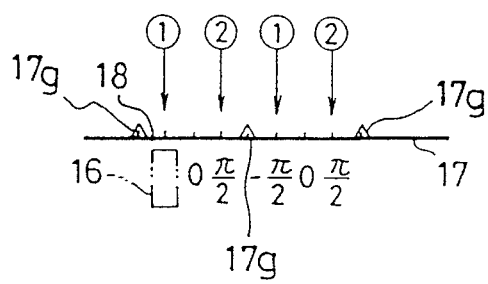
FIG. 2 is an explanatory view of a relationship between a magneto-optic disc and beam incident positions thereof.

FIG. 1 shows a reproducing optical system in a magneto-optic disc apparatus according to a first embodiment of the present invention.

Collimated light beams (linearly polarized light) emitted from a light source 11, such as a semiconductor laser or the like, are reflected by a first beam splitter 13 and converged onto and reflected by a recording track 18 of a magneto-optic (MO) disc 17 at a center portion of said recording track (ie. between the inner and outer groove guides 17g) through an objective lens 15. Return light reflected by the magneto-optic disc 17 runs along the same optical path as the incident light and is collimated by the objective lens 15. The return light is then transmitted through the first beam splitter 13 and made incident upon a second beam splitter 19. The return light incident upon the second beam splitter 19, partly reflected by the reflecting/transmitting surface 19a thereof, heads toward a track signal detecting optical system and a focus signal detecting optical system (not shown).

The return light transmitted through the second beam splitter 19 is made incident upon a halfwave plate 21 in which the polarization direction is changed. A P-polarized light component and an S-polarized light component are transmitted through and reflected by a polarization beam splitter 23, and received by first and second MO sensors 25 and 27, respectively. The light received by the MO sensors 25 and 27 are converted to electrical signals which are outputted as signals S25 and S27, respectively. The difference (S25–S27) between the electrical signals S25 and S27 is used as a reading signal (MO signal).

Before the structure of the magneto-optic disc apparatus of the present invention is explained, the principle on which the present invention is based and the terms used in the present application will be briefly discussed below.

Figure 11:
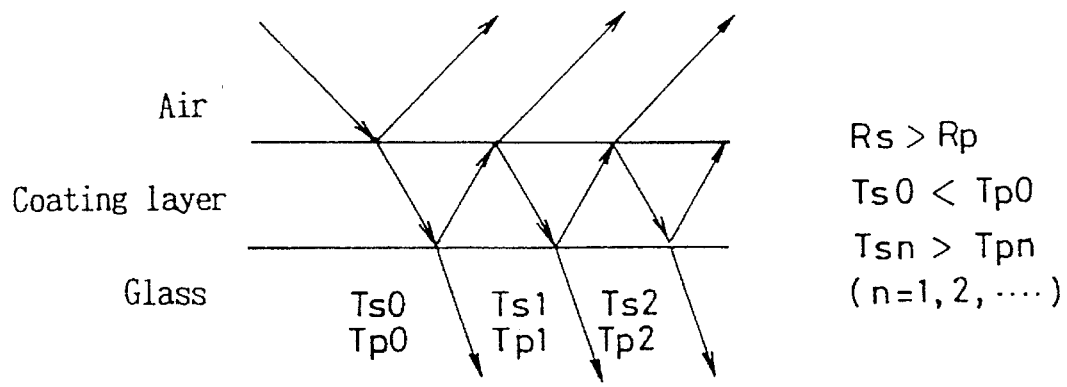
FIG. 11 is an explanatory view of polarization, reflection and transmission of beams; and, FIG. 12 is a diagram of optical paths of an objective lens of a magneto-optic disc apparatus and a magneto-optic disc.

As can be seen in FIG. 11, it is assumed that light is incident upon a transparent glass plate whose outer surface is coated with an anti-reflection layer, at a predetermined incident angle. If a large incident angle is used, the reflectance of the S-polarized light component is larger than the reflectance of the P-polarized light component. Consequently, the light directly transmitted through the anti-reflection coating layer and the glass substrate includes a larger amount of P-polarized light component than the S-polarized light component. However, the light that is multi-internally reflected by the boundary surfaces between the anti-reflection coating and the air and between the anti-reflection coating and the glass substrate includes a larger amount of S-polarized light component than the P-polarized light. This means that the S-polarized light component travels a longer optical length than the P-polarized light and the phase of the S-polarized light component is retarded. Owing to this phenomenon, there is a birefringence of the S-polarized light component and the P-polarized light component. This will be referred to hereinafter as a "structural birefringence".

In a case where the image height is zero in an optical system, there is no birefringence since the light travels along the optical axis and normal to the optical system throughout its path. However, since light passing off axis of an optical system has a predetermined incident angle, birefringence is caused. Therefore, there is a radial or concentric birefringence distribution in real optical systems. Namely, it can be understood that structural birefringence is inevitable.

Furthermore, in the absence of the anti-reflection coating layer, there is no difference in the optical length or the phase between the transmitted P-polarized light component and S-polarized light component which reaches the surface of the glass plate in FIG. 11. However, there is a difference in transmittance between the P-polarized light component caused and S-polarized light component by the glass plate. This phenomenon will be referred to hereinafter as a "structural dichroism". It can be considered in a broad sense that the structural dichroism is a structural birefringence.

Figure 12:
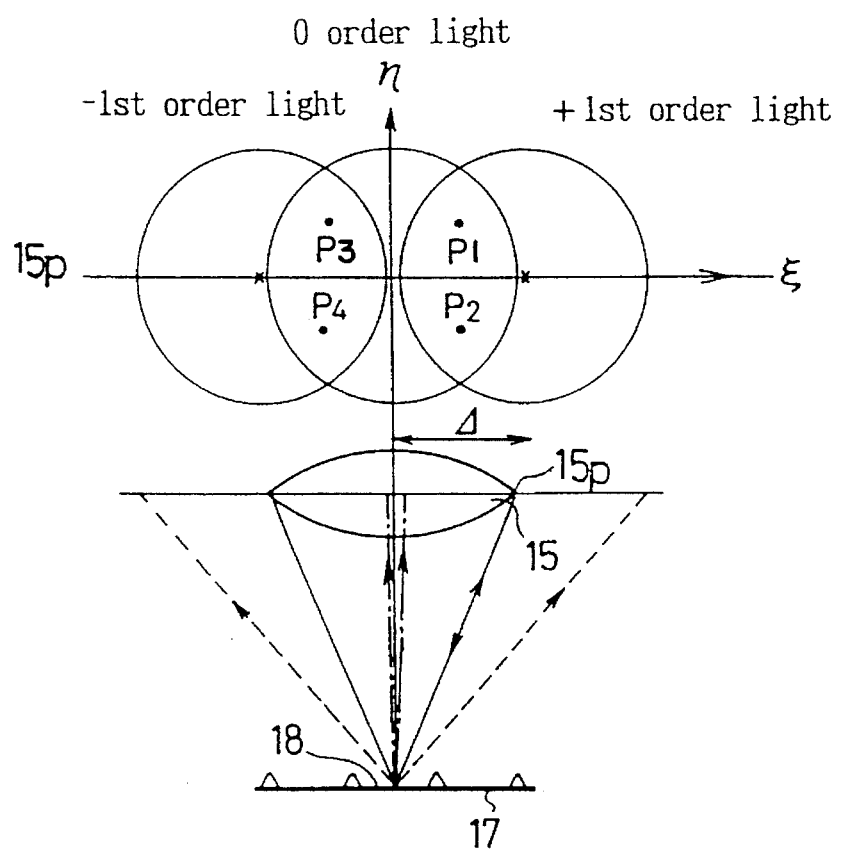

Analysis in Present Invention:

The analysis in the present invention will be described below with reference to FIG. 12, an enlarged view of an optical system in the vicinity of the objective lens 15 and the magneto-optic disc 17 in the optical arrangement shown in FIG. 1. In FIG. 12, the laser beam is converged onto the magneto-optic disc 17 by the objective lens 15 and reflected thereby toward the objective lens 15. In FIG. 12, points P1 through P4 are defined with respect to a plane perpendicular to the optical axis whose origin is located at a position 0, as follows:

P1: 45° with respect to the origin 0, or 135° with respect to the center of the +1st order light;

P2: −45° with respect to the origin 0, or −135° with respect to the center of the +1st order light;

P3: 135° with respect to the origin 0, or 45° with respect to the center of the +1st order light;

P4: −135° with respect to the origin 0, or −45° with respect to the center of the +1st order light;

In FIG. 12, the following requirements are set. Namely:

(i) Fourier analysis can be used for light beams between the pupil $15p$ of the objective lens 15 and the surface of the magneto-optic disc 17;

(ii) The magneto-optic disc 17 can be deemed a one-dimentional phase grating type of diffraction grating. In addition, the magneto-optic disc 17 is of a symmetric shape, that is, it is not biased in one direction. This means that the diffraction efficiency of a +n-order diffracted beam is identical to that of a −n-order diffracted beam. When light is incident upon the center of the track 18 of the magneto-optic disc 17, there is no phase difference between the +n-order diffracted beam and the −n-order diffracted beam;

(iii) In practice, there are little ±2nd order terms or higher order diffracted beams incident upon the pupil. Consequently, in practice, only the ±1st order and 0-order diffracted beams can be taken into account;

(iv) The return light is discussed only at points $P_1$ through $P_4$; and (v) The intensity distribution of incident light is uniform.

Note that the return light passing through points $P_1$ through $P_4$ are made incident upon the four identical split areas 1 through 4 of the photosensors 25 and 27, respectively.

Parameters used in the analysis below of the diffracted light are defined as follows:

a: amplitude of the 0-order term of the diffracted beam;

b: amplitude of +1st order terms of the diffracted beam;

P: phase of ±1st order terms of the diffracted beam incident upon the center of the pits (recording track) of the magneto-optic disc with respect to the 0-order term of the diffracted beam;

x: incident position of light on the magneto-optic disc (standardized and represented by $\pm\pi$ on the "wavefront" with respect to the center (origin 0));

$W_1$: wavefront aberration at point $P_1$;

$M_1$: Jones matrix of birefringence at point $P_1$;

$W_2$: wavefront aberration at point $P_2$;

$M_2$: Jones matrix of birefringence at point $P_2$;

$W_3$: wavefront aberration at point $P_3$;

$M_3$: Jones matrix of birefringence at point $P_3$;

$W_4$: wavefront aberration at point $P_4$;

$M_4$: Jones matrix of birefringence at point $P_4$;

I: Jones vector of the incident light; and $I_n$: vector. The diffracted light is analyzed as follows:

Assuming that the light returned to point $P_1$ is represented by $O_1$ (vector), the 0-order term of the diffracted beam passing through point $P_4$ ($W_4$, $M_4$) upon incidence is subject to the birefringence of $M_1$; and the +1st order term of the diffracted beam passing through point $P_2$ ($W_2$, $M_2$) upon incidence is subject to the birefringence of $M_1$.

Accordingly, the return light $O_1$ is represented by the following formula 1:

$$O_1 = M_1 a e^{iW_4} M_4 I + M_1 b e^{i(W_2+P+x)} M_2 I$$
$$= \{a e^{iW_4} M_1 M_4 + b e^{i(W_2+P+x)} M_1 M_2\} I$$

(formula 1)

Assuming that the light returned to point $P_2$ is represented by $O_2$ (vector), the 0-order term of the diffracted beam passing through point $P_3$ ($W_3$, $M_3$) upon incidence is subject to the birefringence of $M_2$; and the +1st order term of the diffracted beam passing through point $P_1$ ($W_1$, $M_1$) upon incidence is subject to the birefringence of $M_2$.

Accordingly, the return light $O_2$ is represented by the following formula 2:

$$O_2 = \{a e^{iW_3} M_2 M_3 + b e^{i(W_1+P+x)} M_2 M_1\} I \qquad \text{(formula 2)}$$

Assuming that the light returned to point $P_3$ is represented by $O_3$ (vector), the 0-order of the diffracted beam passing through point $P_2$ ($W_2$, $M_2$) upon incidence is subject to the birefringence of $M_3$; and the −1st order term of the diffracted beam passing through point $P_4$ ($W_4$, $M_4$) upon incidence is subject to the birefringence of $M_3$.

Accordingly, the return light $O_3$ is represented by the following formula 3:

$$O_3 = \{a e^{iW_2} M_3 M_2 + b e^{i(W_4+P-x)} M_3 M_4\} I \qquad \text{(formula 3)}$$

Assuming that light returned to point $P_4$ is represented by $O_4$ (vector), the 0-order diffracted beam passing through the point $P_1$ ($W_1$, $M_1$) upon incidence is subject to the birefringence of $M_4$; and the −1st order term of the diffracted beam passing through point $P_3$ ($W_3$, $M_3$) upon incidence is subject to the birefringence of $M_4$.

Accordingly, the return light $O_4$ is represented by the following formula 4:

$$O_4 = \{a e^{iW_1} M_4 M_1 + b e^{i(W_3+P-x)} M_4 M_3\} I \qquad \text{(formula 4)}$$

It is assumed that there is a birefringence distribution on the pupil surface 16 of the objective lens 15 caused by the structural birefringence. In this assumption, the birefringence distribution is radial and concentric, so that the Jones matrix M at the polar coordinates (r, θ) on the pupil is represented by the following:

(formula 5)

$$M(r, \theta) = \begin{pmatrix} \cos^2\theta e^{i\Delta(r)/2} + \sin^2\theta e^{-i\Delta(r)/2} & \cos\theta\sin\theta(e^{i\Delta(r)/2} - e^{-i\Delta(r)/2}) \\ \cos\theta\sin\theta(e^{i\Delta(r)/2} - e^{-i\Delta(r)/2}) & \sin\theta e^{i(r)/2} + \cos^2\theta e^{-i\Delta(r)/2} \end{pmatrix}$$

If $\Delta(r)=\delta$ at $P_1$ (r, θ), formula (5) is substituted by the following:

$$M_1 = \begin{pmatrix} c^2 e_1 + s^2 e_2 & cs(e_1 - e_2) \\ cs(e_1 - e_2) & s^2 e_1 + c^2 e_2 \end{pmatrix} = \begin{pmatrix} \alpha & \beta \\ \beta & \gamma \end{pmatrix} \qquad \text{(formula 6)}$$

At $P_2$ (r, −θ), formula (5) is substituted by the following:

$$M_2 = \begin{pmatrix} c^2 e_1 + s^2 e_2 & -cs(e_1 - e_2) \\ -cs(e_1 - e_2) & s^2 e_1 + c^2 e_2 \end{pmatrix} = \begin{pmatrix} \alpha & -\beta \\ -\beta & \gamma \end{pmatrix} \qquad \text{(formula 7)}$$

At $P_3$ (r, π−θ), formula (5) is substituted by the following:

$$M_3 = \begin{pmatrix} c^2e_1 + s^2e_2 & -cs(e_1 - e_2) \\ -cs(e_1 - e_2) & s^2e_1 + c^2e_2 \end{pmatrix} = M_2 \quad \text{(formula 8)}$$

At $P_4$ (r, π+θ), formula (5) is substituted by the following:

$$M_4 = \begin{pmatrix} c^2e_1 + s^2e_2 & cs(e_1 - e_2) \\ cs(e_1 - e_2) & s^2e_1 + c^2e_2 \end{pmatrix} = M_1 \quad \text{(formula 9)}$$

From the foregoing, we have:

$$\therefore M_1M_4 = M_1^2 \quad \text{(formula 10)}$$

$$= \begin{pmatrix} c^2e_1^2 + s^2e_2^2 & cs(e_1^2 - e_2^2) \\ cs(e_1^2 - e_2^2) & s^2e_1^2 + c^2e_2^2 \end{pmatrix}$$

$$M_1M_2 = \begin{pmatrix} \alpha & \beta \\ \beta & \gamma \end{pmatrix}\begin{pmatrix} \alpha & -\beta \\ -\beta & \gamma \end{pmatrix}$$

$$= \begin{pmatrix} \alpha^2 - \beta^2 & \beta(\gamma - \alpha) \\ \beta(\alpha - \gamma) & \gamma^2 - \beta^2 \end{pmatrix}$$

$$\alpha^2 - \beta^2 = c^4e_1^2 + s^4e_2^2 + 2c^2s^2e_1e_2 - c^2s^2(e_1^2 - 2e_1e_2 + e_2^2)$$
$$= c^2e_1^2(c^2 - s^2) + s^2e_2^2(s^2 - c^2) + 4c^2s^2e_1e_2$$
$$= (c^2 - s^2)(c^2e_1^2 - s^2e_2^2) + 4c^2s^2$$

$$\gamma^2 - \beta^2 = s^4e_1^2 + c^4e_2^2 + 2c^2s^2e_1e_2 - c^2s^2(e_1^2 - 2e_1e_2 + e_2^2)$$
$$= s^2e_2^2(s^2 - c^2) + c^2e_2^2(c^2 - s^2) + 4c^2s^2e_1e_2$$
$$= (s^2 - c^2)(s^2e_1^2 - c^2e_2^2) + 4c^2s^2$$

$$\beta(\alpha - \gamma) = cs(e_1 - e_2)(c^2e_1 + s^2e_2 - s^2e_1 - c^2e_2)$$
$$= cs(e_1 - e_2)\{e_1(c^2 - s^2) + e_2(s^2 - c^2)\}$$
$$= cs(c^2 - s^2)(e_1 - e_2)^2$$

$$M_1M_2 = \begin{pmatrix} (c^2 - s^2)(c^2e_1^2 - s^2e_2^2) + 4c^2s^2 & -cs(c^2 - s^2)(e_1 - e_2)^2 \\ cs(c^2 - s^2)(e_1 - e_2)^2 & (s^2 - c^2)(s^2e_1^2 - c^2e_2^2) + 4c^2s^2 \end{pmatrix} \quad \text{(formula 11)}$$

$$M_2M_3 = M_2^2 = \begin{pmatrix} c^2e_1^2 + s^2e_2^2 & -cs(e_1^2 - e_2^2) \\ -cs(e_1^2 - e_2^2) & s^2e_1^2 + c^2e_2^2 \end{pmatrix} \quad \text{(formula 12)}$$

$$M_2M_1 = \begin{pmatrix} \alpha & -\beta \\ -\beta & \gamma \end{pmatrix}\begin{pmatrix} \alpha & \beta \\ \beta & \gamma \end{pmatrix} \quad \text{(formula 13)}$$

$$= \begin{pmatrix} \alpha^2 - \beta^2 & \beta(\alpha - \gamma) \\ \beta(\gamma - \alpha) & \gamma^2 - \beta^2 \end{pmatrix}$$

$$= \begin{pmatrix} (c^2 - s^2)(c^2e_1^2 - s^2e_2^2) + 4c^2s_2 & cs(c^2 - s^2)(e_1 - e_2)^2 \\ -cs(c^2 - s^2)(e_1 - e_2)^2 & (s^2 - c^2)(s^2e_1^2 - c^2e_2^2) + 4c^2s^2 \end{pmatrix}$$

The Jones matrix $M_1$ through $M_4$ satisfy the following relationship:

$$M_3M_2 = M_2M_2 \quad \text{(formula 14)}$$

$$M_3M_4 = M_2M_1 \quad \text{(formula 15)}$$

$$M_4M_1 = M_1M_1 \quad \text{(formula 16)}$$

$$M_4M_3 = M_1M_2 \quad \text{(formula 17)}$$

(formula 18)
Since the incident light given by a horizontal polarized light is $$\begin{pmatrix} 1 \\ 0 \end{pmatrix},$$

we have $$M_1{}^2I = \begin{pmatrix} c^2e_1{}^2 + s^2e_2{}^2 & cs(e_1{}^2 - e_2{}^2)_1{}^2 \\ cs(e_1{}^2 - e_2{}^2) & s^2e_1{}^2 + c^2e_2{}^2 \end{pmatrix}\begin{pmatrix} 1 \\ 0 \end{pmatrix}$$

$$= \begin{pmatrix} c^2e_1{}^2 + s^2e_2{}^2 \\ cs(e_1{}^2 - e_2{}^2) \end{pmatrix}$$

$$M_1M_2I = \begin{pmatrix} (c^2-s^2)(c^2e_1{}^2 - s^2e_2{}^2) + 4c^2s^2 & -cs(c^2-s^2)(e_1-e_2)^2 \\ cs(c^2-s^2)(e_1-e_2)^2 & (s^2-c^2)(s^2e_1{}^2 - c^2e_2{}^2) + 4c^2s^2 \end{pmatrix}\begin{pmatrix} 1 \\ 0 \end{pmatrix} \quad \text{(formula 19)}$$

$$= \begin{pmatrix} (c^2-s^2)(c^2e_1{}^2 - s^2e_2{}^2) + 4c^2s^2 \\ cs(c^2-s^2)(e_1-e_2)^2 \end{pmatrix}$$

$$M_2{}^2I = \begin{pmatrix} c^2e_1{}^2 + s^2e_1{}^2 & -cs(e_1{}^2 - e_2{}^2) \\ cs(e_1{}^2 - e_2{}^2) & s^2e_1{}^2 + c^2e_2{}^2 \end{pmatrix}\begin{pmatrix} 1 \\ 0 \end{pmatrix} \quad \text{(formula 20)}$$

$$= \begin{pmatrix} c^2e_1{}^2 + s^2e_2{}^2 \\ -cs(e_1{}^2 - e_2{}^2) \end{pmatrix}$$

Figure 9:
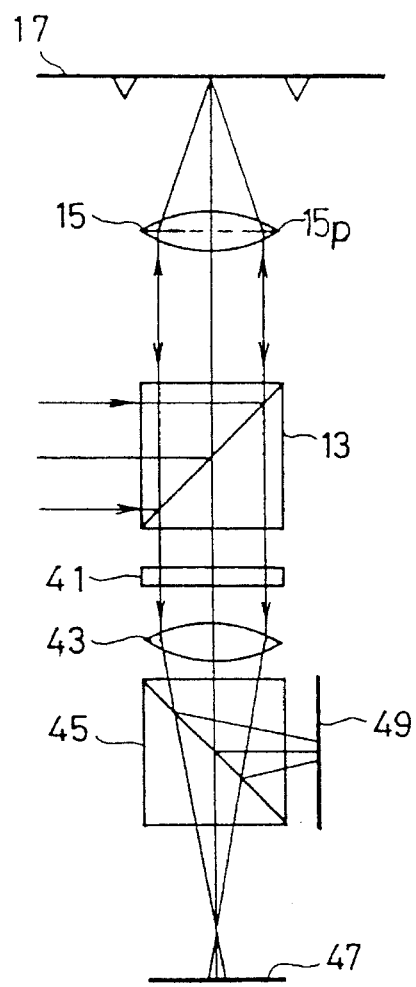
FIGS. 9 is a schematic diagram of optical paths in an optical system of a magneto-optic disc apparatus, according to a third embodiment of the present invention.

If θ=45°, based upon FIG. 9, we have:

$$M_2M_1I = \begin{pmatrix} (c^2-s^2)(c^2e_1{}^2 - s^2e_2{}^2) + 4c^2s^2 & cs(c^2-s^2)(e_1-e_2^2) \\ -cs(c^2-s^2)(e_1-e_2)^2 & (s^2-c^2)(s^2e_1{}^2 - c^2e_2{}^2) + 4c^2s^2 \end{pmatrix}\begin{pmatrix} 1 \\ 0 \end{pmatrix} \quad \text{(formula 21)}$$

$$= \begin{pmatrix} (c^2-s^2)(c^2e_1{}^2 - s^2e_2{}^2) + 4c^2s^2 \\ -cs(c^2-s^2)(e_1-e_2)^2 \end{pmatrix}$$

If θ = 45°, based upon FIG. 9, we have: (formula 22)

$$M_1{}^2I = (1/2)\begin{pmatrix} e_1{}^2 + e_2{}^2 \\ e_1{}^2 - e_2{}^2 \end{pmatrix} = \begin{pmatrix} \cos\delta \\ i\sin\delta \end{pmatrix}$$

$$M_1M_2I = \begin{pmatrix} 1 \\ 0 \end{pmatrix} \quad \text{(formula 22)}$$

$$M_2{}^2I = (1/2)\begin{pmatrix} e_1{}^2 + e_2{}^2 \\ -e_1{}^2 + e_2{}^2 \end{pmatrix} = \begin{pmatrix} \cos\delta \\ -i\sin\delta \end{pmatrix} \quad \text{(formula 24)}$$

$$M_2M_1I = \begin{pmatrix} 1 \\ 0 \end{pmatrix} \quad \text{(formula 25)}$$

From formula 22 through 25 and formula 14 through 17, formula 1 through 4 are respectively substituted by:

$$O_1 = ae^{iW4}M_1{}^2I + be^{i(W2++P+x)}M_1M_2I \quad \text{(formula 26)}$$

$$= ae^{iW4}\begin{pmatrix} \cos\delta \\ i\sin\delta \end{pmatrix} + be^{i(W2++x)}\begin{pmatrix} 1 \\ 0 \end{pmatrix}$$

$$O_2 = ae^{iW3}M_2{}^2I + be^{i(W1+P+x)}M_2M_1I \quad \text{(formula 27)}$$

$$= ae^{iW3}\begin{pmatrix} \cos\delta \\ -i\sin\delta \end{pmatrix} + be^{i(W1+P+x)}\begin{pmatrix} 1 \\ 0 \end{pmatrix}$$

$$O_3 = ae^{iW2}M_2{}^2I + be^{i(W4+P-x)}M_2M_1I \quad \text{(formula 28)}$$

$$= ae^{iW2}\begin{pmatrix} \cos\delta \\ -i\sin\delta \end{pmatrix} + be^{i(W4+P-x)}\begin{pmatrix} 1 \\ 0 \end{pmatrix}$$

$$O_4 = ae^{iW1}M_1{}^2I + be^{i(W3+P-x)}M_2M_2I \quad \text{(formula 29)}$$

$$= ae^{iW1}\begin{pmatrix} \cos\delta \\ i\sin\delta \end{pmatrix} + be^{i(W3+P-x)}\begin{pmatrix} 1 \\ 0 \end{pmatrix}$$

In conclusion, we have:

$$O_n = \begin{pmatrix} A_n\cos\delta + B_n \\ \pm iA_n\sin\delta \end{pmatrix} \quad \text{(formula 30)}$$

The sign "±" before n means upper sign as "+" when n=1, 4 and lower sign − when n=2, 3, we have:

$$A_n = ae^{iwm}$$

$$B_n = be^{i(we+P\pm x)}$$

The n, m, l satisfy the following relationship:

| n | m | l |
|---|---|---|
| 1 | 4 | 2 |
| 2 | 3 | 1 |
| 3 | 2 | 4 |
| 4 | 1 | 3 |

Since the direction of polarization is rotated 45° by the polarizer or the halfwave plate to obtain the MO signals, the MO signal $O_{n45}$ is given by the following formula:

$$O_{n45} = 2^{-1/2} \begin{pmatrix} An(\cos\delta \mp i\sin\delta) + Bn \\ An(\cos\delta \pm i\sin\delta) + Bn \end{pmatrix}$$

$$= 2^{-1/2} \begin{pmatrix} Ane^{\mp i\delta} + Bn \\ Ane^{\pm i\delta} + Bn \end{pmatrix}$$

$$= 2^{-1/2} \begin{pmatrix} ae^{i(Wm \mp \delta)} + b\, e^{i(We+P\pm x)} \\ ae^{i(Wm \pm \delta)} + b\, e^{i(We+P\pm x)} \end{pmatrix}$$

$$= 2^{-1/2} \begin{pmatrix} a\cos(Wm \mp \delta) + b\cos(We+P\pm x) + i\{a\sin(Wm \mp \delta) + b\sin(We+P\pm x)\} \\ a\cos(Wm \pm \delta) + b\cos(We+P\pm x) + i\{a\sin(Wm \pm \delta) + b\sin(We+P\pm x)\} \end{pmatrix}$$

(formula 31)

The sign "±", "∓" before n means upper sign when n=1, 4 and lower sign when n=2, 3.

The return light received by the photo sensors 25 and will be discussed below in connection with signals.

The intensities of light in the directions x and y in the formula 31 are represented by formulae 32 and 33 below:

$$\begin{aligned} I_{n45X} &= (1/2)\{a\cos(Wm \mp \delta) + b\cos(We+P\pm x)\}^2 + \\ &\quad \{a\sin(Wm \mp \delta) + b\sin(We+P\pm x)\}^2 \\ &= (1/2)[a^2 + b^2 + 2ab\{\cos(Wm \mp \delta)\cos(We+P\pm x) + \sin(Wm \mp \delta)\sin(We+P\pm x)\}] \\ &= (1/2)\{a^2 + b^2 + 2ab\cos(Wm - We \mp \delta - P \mp x)\} \end{aligned}$$ (formula 32)

$$I_{n45Y} = (1/2)\{a^2+b^2+2ab\cos(Wm-We\pm\delta-P\mp x)\}$$ (formula 33)

The differential signal is represented by:

$$\begin{aligned} I_{n45X} - I_{n45Y} &= ab\{\cos(Wm-We\mp\delta-P\mp x) - \cos(Wm-We\pm\delta-P\mp x)\} \\ &= ab\{\cos(Wm-We-P\mp x)\cos\delta \pm \sin(Wm-We-P\mp x)\sin\delta - \\ &\quad \cos(Wm-We-P\mp x)\cos\delta \pm \sin(Wm-We-P\mp x)\sin\delta\} \\ &= \pm 2ab\sin\delta\sin(Wm-We-P\mp x) \end{aligned}$$ (formula 34)

The sign "±", "∓" before n means upper sign when n=1, 4 and lower sign when n=2, 3.

$$M = \sum_{n=1}^{4} (I_{n45X} - I_{n45Y})$$ (formula 35)

$$= 2ab\sin\delta\{\sin(W_4 - W_2 - P - x) - \sin(W_3 - W_1 - P - x) - \sin(W_2 - W_4 - P + x) + \sin(W_1 - W_3 - P + x)\}$$

$$= 2ab\sin\delta\{\sin(W_4 - W_2)\cos(P+x) - \cos(W_4 - W_2)\sin(P+x) - \sin(W_3 - W_1)\cos(P+x) + \cos(W_3 - W_1)\sin(P+x) - \sin(W_2 - W_4)\cos(P-x) + \cos(W_2 - W_4)\sin(P-x) + \sin(W_1 - W_3)\cos(P-x) - \cos(W_1 - W_3)\sin(P-x)\}$$

$$= 2ab\sin\delta\{\sin(W_4 - W_2)(\cos P\cos x - \sin P\sin x)$$

$$\cos(W_4 - W_2)(\sin P\cos x + \cos P\sin x) - \sin(W_3 - W_1)(\cos P\cos x - \sin P\sin x) + \cos(W_3 - W_1)(\sin P\cos x + \cos P\sin x) + \sin(W_4 - W_2)(\cos P\cos x + \sin P\sin x) + \cos(W_4 - W_2)(\sin P\cos x - \cos P\sin x) - \sin(W_3 - W_1)(\cos P\cos x + \sin P\sin x) + \cos(W_3 - W_1)(\sin P\cos x - \cos P\sin x)\}$$

-continued
$$= -4ab\sin\delta\cos P[\sin x\{\cos(W_4 - W_2) - \cos(W_3 - W_1)\} - \cos x\{\sin(W_1 - W_2) - \sin(W_3 - W_1)\}]$$

Position Sensor Signal:

The signals In of the MO sensor that is split into four identical detection areas with respect to the orthogonal axes can be analyzed as follows:

Formula 30 mentioned above is modified as follows:

$$O_n = \begin{pmatrix} ae^{iWm}\cos\delta + be^{i(W_1+P\pm x)} \\ \pm ae^{iWm}\sin\delta \end{pmatrix}$$ (formula 36)

$$= \begin{pmatrix} a\cos\delta\cos Wm + b\cos(We+P\pm x) + \\ i(a\cos\delta\sin Wm + b\sin(We+P\pm x) \\ \pm iae^{iWm}\sin\delta \end{pmatrix}$$

The intensity of light (sensor signal) is represented by the following formula:

$$\begin{aligned} I_n &= \{a\cos\delta\cos Wm + b\cos(We+P\pm x)\}^2 + \\ &\quad \{a\cos\delta\sin Wm + b\sin(We+P\pm x)\}^2 + \\ &\quad a^2\sin^2\delta \\ &= a^2\cos^2\delta\cos^2 Wm + \\ &\quad 2ab\cos\delta\cos Wm\cos(We+P\pm x) + \\ &\quad b^2\cos^2(We+P\pm x) + a^2\delta\sin^2 Wm + \\ &\quad 2ab\cos\delta\sin Wm\sin(We+P\pm x) + \\ &\quad b^2\sin^2(We+P\pm x) + a^2\sin^2\delta \\ &= a^2 + b^2 + 2ab\cos\delta\{\cos Wm\cos(We+P\pm x) + \\ &\quad \sin Wm\sin(We+P\pm x)\} \\ &= a^2 + b^2 + 2ab\cos\delta\cos(Wm - We - P \mp x) \end{aligned}$$ (formula 37)

Sensor signals $I_1$ through $I_4$ of each split sensor are as follows:

$$I_1 = a^2 + b^2 + 2ab\cos\delta\cos(W_4 - W_2 - P - x)$$ (formula 38)

$$I_2 = a^2 + b^2 + 2ab\cos\delta\cos(W_3 - W_1 - P - x)$$ (formula 39)

$$I_3 = a^2 + b^2 + 2ab\cos\delta\cos(W_2 - W_4 - P + x)$$ (formula 40)

$$I_4 = a^2 + b^2 + 2ab\cos\delta\cos(W_1 - W_3 - P + x)$$ (formula 41)

Tracking Signal:

Tracking signal T obtained in a push-pull method is determined by the following formula:

$$T = I_1 + I_2 - I_3 - I_4$$ (formula 42)

Since sensor signals $I_1$ through $I_4$ are given by formulae 38 through 41, the tracking signal T is represented by the following formula, using formula 42 mentioned above:

$$T = a^2 + b^2 + 2ab\cos\delta\cos(W_4 - W_2 - P - x) + \\ a^2 + b^2 + 2ab\cos\delta\cos(W_3 - W_1 - P - x) -$$ (formula 43)

-continued
$$\begin{aligned}
&a^2 - b^2 - 2ab\cos\delta\cos(W_2 - W_4 - P + x) - \\
&a^2 - b^2 - 2ab\cos\delta\cos(W_1 - W_3 - P + x) \\
&= 2ab\cos\delta\{\cos(W_4 - W_2)\cos(P + x) + \\
&\quad \sin(W_4 - W_2)\sin(P + x) + \\
&\quad \cos(W_3 - W_1)\cos(P + x) + \\
&\quad \sin(W_3 - W_1)\sin(P - x) - \\
&\quad \cos(W_2 - W_4)\cos(P - x) - \\
&\quad \sin(W_2 - W_4)\sin(P - x) - \\
&\quad \cos(W_1 - W_4)\cos(P - x) - \\
&\quad \sin(W_1 - W_3)\sin(P - x)\} \\
&= 2ab\cos\delta[\cos(W_4 - W_2)\{\cos(P + x) - \\
&\quad \cos(P - x)\} + \sin(W_4 - W_2)\{\sin(P + x) + \\
&\quad \sin(P - x)\} + \cos(W_3 - W_1)\{\cos(P + x) - \\
&\quad \cos(P - x)\} + \sin(W_3 - W_1)\{\sin(P + x) + \\
&\quad \sin(P - x)\}] \\
&= 2ab\cos\delta[-2\sin P\sin x\{\cos(W_4 - W_2) + \\
&\quad \cos(W_3 - W_1)\} + 2\sin P\cos x\{\sin(W_4 - W_2) + \\
&\quad \sin(W_3 - W_1)\}] \\
&= -4ab\cos\delta\sin P[\sin\{\cos(W_4 - W_2) + \\
&\quad \cos(W_3 - W_1)\} - \cos x\{\sin(W_4 - W_2) + \\
&\quad \sin(W_3 - W_1)\}]
\end{aligned}$$

Focus Signal F (signal to be inputted to the focus sensor):

When the focus signal F is obtained by the astigmatism method, the focus signal F is represented as follows:

$$F = I_1 + I_2 I_3 + I_4 \quad \text{(formula 44)}$$

When formula 44 is substituted with formulae 38 through 41, the focus signal F is obtained as follows:

$$\begin{aligned}
F &= a^2 - b^2 + 2ab\cos\delta\cos(W_4 - W_2 - P - x) - \\
&\quad a^2 - b^2 - 2ab\cos\delta(W_3 - W_1 - P - x) - \\
&\quad a^2 - b^2 - 2ab\cos\delta(W_2 - W_4 - P + x) + \\
&\quad a^2 + b^2 + 2ab\cos\delta(W_1 - W_3 - P + x) \\
&= 2ab\cos\delta\{(W_4 - W_2)\cos(P + x) + \\
&\quad \sin(W_4 - W_2)\sin(P + x) - \\
&\quad \cos(W_3 - W_1)\cos(P + x) - \\
&\quad \sin(W_3 - W_1)\sin(P + x) - \\
&\quad \cos(W_2 - W_4)\cos(P - x) - \\
&\quad \sin(W_2 - W_4)\sin(P - x) - \\
&\quad \cos(W_1 - W_3)\cos(P - x) + \\
&\quad \sin(W_1 - W_3)\sin(P - x)\} \\
&= 2ab\cos\delta[\cos(W_4 - W_2)\{\cos(P + x) - \\
&\quad \cos(P - x)\} + \\
&\quad \sin(W_4 - W_2)\{\sin(P + x) + \sin(P - x)\} - \\
&\quad \cos(W_3 - W_1)\{\cos(P + x) - \cos(P - x)\} - \\
&\quad \sin(W_3 - W_1)\{\sin(P + x) + \sin(P - x)\}] \\
&= 2ab\cos\delta[-2\sin P\sin x\{\cos(W_4 - W_2) - \\
&\quad 2\sin P\cos x\{\sin(W_4 - W_2) - \sin(W_3 - W_1)\}] \\
&= -4ab\cos\delta\sin P[\sin\{\cos(W_4 - W_2) - \\
&\quad \cos(W_3 - W_1)\} - \cos x\{\sin(W_4 - W_2) - \\
&\quad \sin(W_3 - W_1)\}]
\end{aligned} \quad \text{(formula 45)}$$

Upper and Lower Unbalance Signal U:

Although no unbalance signal U is practically used, the signal is represented by the following formula:

$$U = I_1 - I_2 + I_3 - I_4 \quad \text{(formula 46)}$$

When formulae 38 through 41 are substituted for $I_1$ through $I_4$, the upper and lower unbalance signal U is given by:

$$\begin{aligned}
U &= a^2 + b^2 + 2ab\cos\delta\cos(W_4 - W_2 - P - x) - \\
&\quad a^2 - b^2 - 2ab\cos\delta\cos(W_3 - W_1 - P - x) + \\
&\quad a^2 + b^2 + 2ab\cos\delta\cos(W_2 - W_4 - P + x) - \\
&\quad a^2 - b^2 - 2ab\cos\delta\cos(W_1 - W_3 - P + x) \\
&= 2ab\cos\delta\{\cos(W_4 - W_2)\cos(P + x) + \\
&\quad \sin(W_4 - W_2)\sin(P + x) - \\
&\quad \cos(W_3 - W_1)\cos(P + x) - \\
&\quad \sin(W_3 - W_1)\sin(P + x) + \\
&\quad \cos(W_2 - W_4)\cos(P - x) + \\
&\quad \sin(W_2 - W_4)\sin(P - x) - \\
&\quad \cos(W_1 - W_3)\cos(P - x) - \\
&\quad \sin(W_1 - W_3)\sin(P - x)\} \\
&= 2ab\cos\delta[\cos(W_4 - W_2)\{\cos(P + x) + \\
&\quad \cos(P - x)\} + \sin(W_4 - W_2)\{\sin(P + x) - \\
&\quad \sin(P - x)\} - \cos(W_3 - W_1)\{\cos(P + x) + \\
&\quad \cos(P - x)\} - \sin(W_3 - W_1)\{\sin(P + x) - \\
&\quad \sin(P - x)\}] \\
&= 2ab\cos\delta 2\cos P\cos x\{\cos(W_4 - W_2) - \\
&\quad \cos(W_3 - W_1)\} - 2\cos P\sin x\{\sin(W_4 - W_2) - \\
&\quad \sin(W_3 - W_1)\}] \\
&= 4ab\cos\delta\cos P[\cos x\{\cos(W_4 - W_2) - \\
&\quad \cos(W_3 - W_1)\} + \sin x\{\sin(W_4 - W_2) - \\
&\quad \sin(W_3 - W_1)\}]
\end{aligned}$$

Classification of Aberration Types:

Lower order terms representing the aberration of diffracted light beams may be classified into the following four groups due to the symmetry of the aberration. When the axes $\xi$ and $\eta$ are defined as shown in FIG. 12, low order aberration terms satisfy the following relationship:

ⓐ the aberration which is represented by an even function with respect to both the axes $\xi$ and $\eta$ (e.g., spherical aberration, astigmatism 1 (in 0° direction), defocus, etc.);

ⓑ the aberration which is represented by an even function with respect to the axis $\xi$ and an odd function with respect to the axis $\eta$, respectively (e.g., comatic aberration 2 (in the direction $\eta$), $\xi$-tilt, etc.);

ⓒ the aberration which is represented by an odd function with respect to the axis $\xi$ and an even function with respect to the axis $\eta$, respectively (e.g., comatic aberration 1 (in the direction $\xi$), $\eta$-tilt, etc.);

ⓓ the aberration which is represented by an odd function with respect to both the axes $\xi$ and $\eta$ (e.g., astigmatism 2 (in 45° direction), etc.).

Aberration of Even Function with respect to axes $\xi$ and $\eta$:

Due to the symmetry, the wavefront aberration W is given by:

$$W_1 = W_2 = W_3 = W_4 = W \quad \text{(formula 48)}$$

From formulae 43, 45, 47 and 35 for the tracking signal T, the focus signal F, the upper and lower unbalance signal U, and the MO signal, respectively, the tracking signal $T_{ee}$, the focus signal $F_{ee}$, the upper and lower unbalance signal $U_{ee}$, and the MO signal $M_{ee}$, are represented by:

$$T_{ee} = -8ab \cos \delta \sin P \sin x \quad \text{(formula 49)}$$

$$F_{ee} = 0 \quad \text{(formula 50)}$$

$$U_{ee} = 0 \quad \text{(formula 51)}$$

$$M_{ee} = 0 \quad \text{(formula 52)}$$

As can be seen from the foregoing, if there is an aberration represented by an even function with respect to both the axes $\xi$ and $\eta$, only the tracking signal T is generated, and the focus (noise) signal F, the upper and lower unbalance signal U and the MO (noise) signal are not generated.

Aberration of Even Function and Odd Function with respect to axes $\xi$ and $\eta$, respectively:

Due to the symmetry, the wavefront aberration W is given by:

$$W_1 = -W_2 = W_3 = -W_4 = W \quad \text{(formula 53)}$$

From formulae 43, 45, 47 and 35 for the tracking signal T, the focus signal F, the upper and lower unbalance signal U, and the MO signal, respectively, the tracking signal $T_{eo}$, the focus signal $F_{eo}$, the upper and lower unbalance signal $U_{eo}$, and the MO signal $M_{eo}$ are represented by:

$$T_{eo} = -8ab \cos \delta \sin P \sin x \quad \text{(formula 54)}$$

$F_{eo}=0$ (formula 55)

$U_{eo}=0$ (formula 56)

$M_{eo}=0$ (formula 57)

As can be seen from the foregoing, if there is an aberration represented by an even function with respect to the axis $\xi$ and an odd function with respect to the axis $\eta$, respectively, only the tracking signal T is generated, similar to the aberration represented by an even function with respect to both the axes $\xi$ and $\eta$.

Aberration of Odd Function and Even Function with respect to axes $\xi$ and $\eta$, respectively.

Due to the symmetry, the wavefront aberration W is given by:

$W_1=W_2=-W_3=-W_4=W$ (formula 58)

From the formulae 43, 45, 47 and 35 for the tracking signal T, the focus signal F, the upper and lower unbalance signal U, and the MO signal, respectively, the tracking signal $T_{oe}$, the focus signal $F_{oe}$, the upper and lower unbalance signal $U_{oe}$, and the MO signal $M_{oe}$ are represented by:

$T_{oe}=-8ab \cos \delta \sin P \sin (x+2W)$ (formula 59)

$F_{oe}=0$ (formula 60)

$U_{oe}=0$ (formula 61)

$M_{oe}=0$ (formula 62)

As can be seen from the foregoing, there is a phase of 2W of the tracking signal $T_{oe}$. However, the focus (noise) signal Foe, the upper and lower unbalance signal $U_{oe}$ and the MO (noise) signal $M_{oe}$ are all zero.

Aberration of $O_{dd}$ Function with respect to both axes $\xi$ and $\eta$:

For a wavefront aberration W is given by (assuming symmetry );

$W_1=-W_2=-W_3=W_4=W$ (formula 63)

From formulae 43, 45, 47 and 35 for the tracking signal T, the focus signal F, the upper and lower unbalance signal U, and the MO signal, respectively, the tracking signal $T_{oo}$, the focus signal $F_{oo}$, the upper and lower unbalance signal $U_{oo}$, and the MO signal $M_{oo}$ are represented by:

$T_{oo}=-8ab \cos \delta \sin P \cos 2W \sin x$ (formula 64)

$F_{oo}=8ab \cos \delta \sin P \sin 2W \cos x$ (formula 65)

$U_{oo}=8ab \cos \delta \cos P \sin 2W \sin x$ (formula 66)

$M_{oo}=8ab \sin \delta \cos P \sin 2W \cos x$ (formula 67)

As can be seen from the foregoing, an FT (focusing/tracking) crosstalk as well as the crosstalk of the upper and lower unbalance signal U, the MO signal M and the tracking signal T are caused. For instance, in an optical system in which there is an astigmatism AS2 in the direction of 45°, if there is no structural birefringence, the MO signal M of the magneto-optic disc which is not magnetized becomes 0. However, if there is a structural birefringence, crosstalk is added to the MO signal M.

Structural Dichroism:

The above discussion has been directed to the analysis based on the structural birefringence. The analysis based on the structural dichroism is given below.

The Jones matrix M of the dichroic element having amplitude transmittances $t_1$ and $t_2$ is represented as follows;

$$M = \begin{pmatrix} t_1\cos^2\theta + t_2\sin^2\theta & (t_1 - t_2)\sin\theta\cos\theta \\ (t_1 - t_2)\sin\theta\cos\theta & t_1\sin^2\theta + t_2\cos^2\theta \end{pmatrix}$$ (formula 68)

Similar to formulae 5 through 31, the following results are obtained:

$$M_1^2 = \begin{pmatrix} t_1^2\cos^2\theta + t_2^2\sin^2\theta & (t_1^2 - t_2^2)\sin\theta\cos\theta \\ (t_1^2 - t_2^2)\sin\theta\cos\theta & t_1^2\sin^2\theta + t_2^2\cos^2\theta \end{pmatrix}$$ (formula 69)

$M_1 M_2 =$ (formula 70)

$$\begin{pmatrix} (C^2 - S^2)(C^2 t_1^2 - S^2 t_2^2) + 4C^2S^2 t_1 t_2 & -CS(C^2 - S^2)(t_1 - t_2)^2 \\ CS(C^2 - S^2)(t_1 - t_2)^2 & (S^2 - C^2)(S^2 e_1^2 - C^2 e_1^2) + 4C^2 S^2 t_1 t_2 \end{pmatrix}$$

$M_2 M_1 = (M_1 M_2)^t$ (formula 71)

$$M_2^2 = \begin{pmatrix} t_1^2\cos^2\theta + t_2^2\sin^2\theta & -(t_1^2 - t_2^2)SC \\ -(t_1^2 - t_2^2)SC & t_1^2 S^2 + t_2^2 C^2 \end{pmatrix}$$ (formula 72)

$$M_1^2 I = M_1^2 \begin{pmatrix} 1 \\ 0 \end{pmatrix} = \begin{pmatrix} t_1^2\cos^2\theta + t_2^2\sin^2\theta \\ (t_1^2 - t_2^2)\sin\theta\cos\theta \end{pmatrix}$$ (formula 73)

$$M_1 M_2 I = \begin{pmatrix} (C^2 - S^2)(C^2 t_1^2 - S^2 t_2^2) + 4C^2 S^2 t_1 t_2 \\ CS(C^2 - S^2)(t_1^2 - t_2^2) \end{pmatrix}$$ (formula 74)

$$M_2^2 I = \begin{pmatrix} t_1^2 c^2 + t_2^2 S^2 \\ -CS(t_1^2 - t_2^2) \end{pmatrix}$$ (formula 75)

When $\theta=45°$, $$M_1^2 I = 1/2 \begin{pmatrix} t_1^2 + t_2^2 \\ t_1^2 - t_2^2 \end{pmatrix}$$ (formula 76)

$$M_1 M_2 I = \begin{pmatrix} t_1 t_2 \\ 0 \end{pmatrix}$$ (formula 77)

$$M_2^2 I = 1/2 \begin{pmatrix} t_1^2 + t_2^2 \\ t_2^2 - t_1^2 \end{pmatrix}$$ (formula 78)

$$M_2 M_1 I = \begin{pmatrix} t_1 t_2 \\ 0 \end{pmatrix}$$ (formula 79)

$$O_1 = (1/2)ae^{iw4} \begin{pmatrix} t_1^2 + t_2^2 \\ t_1^2 - t_2^2 \end{pmatrix} + be^{i(w2+p+x)} \begin{pmatrix} t_1 t_2 \\ 0 \end{pmatrix}$$ (formula 80)

$$O_2 = (1/2)ae^{iw3} \begin{pmatrix} t_1^2 + t_2^2 \\ t_1^2 - t_2^2 \end{pmatrix} + be^{i(w1+p+x)} \begin{pmatrix} t_1 t_2 \\ 0 \end{pmatrix}$$ (formula 81)

$$O_3 = (1/2)ae^{iw2} \begin{pmatrix} t_1^2 + t_2^2 \\ t_2^2 - t_1^2 \end{pmatrix} + be^{i(w4+p-x)} \begin{pmatrix} t_1 t_2 \\ 0 \end{pmatrix}$$ (formula 82)

$$O_4 = (1/2)ae^{iw1} \begin{pmatrix} t_1^2 + t_2^2 \\ t_2^2 - t_1^2 \end{pmatrix} + be^{i(w3+p-x)} \begin{pmatrix} t_1 t_2 \\ 0 \end{pmatrix}$$ (formula 83)

$$O_n = \begin{pmatrix} (1/2)(t_1^2 + t_2^2)A_n + t_1 t_2 B_n \\ \pm(1/2)(t_1^2 - t_2^2)A_n \end{pmatrix}$$ (formula 84)

$$= \begin{pmatrix} (1/2)ae^{iwm}(t_1^2 + t_2^2) + be^{i(we+p\pm x)}t_1 t_2 \\ (1/2)(t_1^2)ae^{iwm} \end{pmatrix}$$

$\therefore I_n =$ (formula 85)

-continued $$\{(1/2)a(t_1^2 + t_2^2)\cos W_m + bt_1t_2\cos(We + P \pm x)\}^2 +$$
$$\{(1/2)a(t_1^2 + t_2^2)\sin W_m + bt_1t_2\sin(We + P \pm x)\}^2 +$$
$$(1/4)(t_1^2 - t_2^2)^2 a^2$$

$$= (1/4)a^2(t_1^2 + t_2^2)^2\cos^2 W_m +$$
$$abP_1P_2(t_1^2 + t_2^2)\cos W_m\cos(We + P \pm x) +$$
$$b^2t_1^2t_2^2\cos^2(We + P \pm x) +$$
$$(1/4)a^2(t_1^2 + t_2^2)^2\sin^2 W_m +$$
$$abP_1P_2(t_1^2 - t_2^2)\sin W_m\sin(We + P \pm x) +$$
$$b^2t_1^2t_2^2\sin^2(We + P \pm x) + (1/4)a^2(t_1^2 - t_2^2)^2$$

$$= (1/4)a^2\{(t_1^2 + t_2^2)^2 + (t_1^2 - t_2^2)^2\} + b^2t_1^2t_2^2 +$$
$$abP_1P_2(t_1^2 + t_2^2)\{\cos W_m\cos(We + P \pm x) +$$
$$\sin W_m\sin(We + P \pm x)\}$$

$$= (1/2)(t_1^4 + t_2^4)a^2 + t_1^2t_2^2b^2 +$$
$$abt_1t_2(t_1^2 + t_2^2)\cos(W_m - We - P \mp x)$$

The portion of formula 85 representing the alternative current is identical to the formula 37 when $t_1t_2(t_1^2+t_2^2)$ is $2\cos\delta$.

$T = -2abt_1t_2(t_1^2+t_2^2)\sin P [\sin x \{\cos(W_4-W_2)+\cos(W_3-W_1)\} - \cos x \{\sin(W_4-W_2)+\sin(W_3-W_1)\}]$ (formula 86)

$F = -2abt_1t_2(t_1^2+t_2^2)\sin P [\sin x \{\cos(W_4-W_2)-\cos(W_3-W_1)\} - \cos x \{\sin(W_4-W_2)-\sin(W_3-W_1)\}]$ (formula 87)

$U = 2abt_1t_2(t_1^2+t_2^2)\sin P [\cos x \{\cos(W_4-W_2)-\cos(W_3-W_1)\}+\sin x \{\sin(W_4-W_2)-\sin(W_3-W_1)\}]$ (formula 88)

For the MO signal system, when the formula 84 is rotated by 45°, we have:

$$O_{145} = 2^{-1/2}\begin{pmatrix} t_2^2A_1 + t_2t_1B_1 \\ t_1^2A_1 + t_2t_1B_1 \end{pmatrix}$$ (formula 89)

$$O_{245} = 2^{-1/2}\begin{pmatrix} t_1^2A_2 + t_2t_1B_2 \\ t_2^2A_2 + t_2t_1B_2 \end{pmatrix}$$ (formula 90)

$$O_{345} = 2^{-1/2}\begin{pmatrix} t_1^2A_3 + t_2t_1B_3 \\ t_2^2A_3 + t_2t_1B_3 \end{pmatrix}$$ (formula 91)

$$O_{445} = 2^{-1/2}\begin{pmatrix} t_2^2A_4 + t_2t_1B_4 \\ t_1^2A_4 + t_2t_1B_4 \end{pmatrix}$$ (formula 92)

$I_{1x} =$ (formula 93)

$$(1/2)\{t_2^2 a\cos W_4 + t_1t_2 b\cos(W_2 + P + x)\}^2 +$$
$$(1/2)\{t_2^2 a\sin W_4 + t_1t_2 b\sin(W_2 + P + x)\} =$$
$$(1/2)(t_2^4 a^2 + t_2^2 t_1^2 b^2) +$$
$$t_1^3 t_1 ab\{\cos W_4\cos(W_2 + P + x) + \sin W_4\sin(W_2 + P + x)\} =$$

$$(1/2)(t_2^4 a^2 + t_2^2 P_1^2 b^2) + t_1t_2^2 ab\cos(W_4 - W_2 - P - x)$$

$I_{1y}=(1/2)(t_1^4 a^2+t_2^2 t_1^2 b^2)+t_1^2 t_2 ab \cos (W_4-W_2-P-x)$ (formula 94)

$I_{2x}=(1/2)(t_1^4 a^2+t_2^2 P_1^2 b^2)+t_1^2 t_2 ab \cos (W_3-W_1-P-x)$ (formula 95)

$I_{2y}=(1/2)(t_2^4 a^2+t_2^2 t_1^2 b^2)+t_1t_2^2 ab \cos (W_3-W_1-P-x)$ (formula 96)

$I_{3x}=(1/2)(t_1^4 a^2+t_2^2 t_1^2 b^2)+t_1^3 t_2 ab \cos (W_2-W_4-P+x)$ (formula 97)

$I_{3y}=(1/2)(t_2^4 a^2+t_2^2 t_1^2 b^2)+t_1t_2^3 ab \cos (W_2-W_4-P+x)$ (formula 98)

$I_{4x}=(1/2)(t_2^4 a^2+t_2^2 t_1^2 b^2)+t_1t_2^3 ab \cos (W_1-W_3-P+x)$ (formula 100)

Consequently, the MO signal is defined by formula 101 below.

$M = I_{1x} - I_{1y} + I_{2x} - I_{2y} + I_{3x} - I_{3y} + I_{4x} - I_{4y} =$ (formula 101)

$-2abt_1t_2(t_2^2 - t_1^2)\sin P[\sin x \times \{\cos(W_4 - W_2) -$ $\cos(W_3 - W_1)\} - \cos x \times \{\sin(W_4 - W_2) - \sin(W_3 - W_1)\}]$ Formula 101 is identical to formula 35 when $2\sin\delta \cos P$ in the latter is substituted by $t_1t_2(t_2^2-t_1^2) \sin P.$ As can be understood from the analysis mentioned above, the structural dichroism has an effect similar to the structural birefringence.

In summary, (1) in case of structural birefringence:
    ⓐ tracking signal T
(formula 102)
    $T=-4abc\cos\delta \quad \sin P[\sin x\{\cos(W_4-W_2)+\cos(W_3-W_1)\}-\cos x\{\sin(W_4-W_2)+\sin(W_3-W_1)\}]$
    ⓑ focusing (noise) signal F
(formula 103)
    $F=-4abc\cos\delta \quad \sin P[\sin x\{\cos(W_4-W_2)-\cos(W_3-W_1)\}-\cos x\{\sin(W_4-W_2)-\sin(W_3-W_1)\}]$
    ⓒ upper and lower unbalance signal U
(formula 104)
    $U=4abc\cos\delta \quad \cos P[\cos x\{\cos(W_4-W_2)-\cos(W_3-W_1)\}+\sin x\{\sin(W_4-W_2)-\sin(W_3-W_1)\}]$
    ⓓ MO (noise) signal MO
(formula 105)
    $M=-4ab\sin\delta \quad \cos P[\sin x\{\cos(W_4-W_2)-\cos(W_3-W_1)\}-\cos x\{\sin(W_4-W_2)-\sin(W_3-W_1)\}]$ (2) in case of structural dichroism:
    ⓐ tracking signal T
(formula 106)
    $T=-2abt_1t_2(t_1^2+t_2^2)\sin P[\sin x\{\cos(W_4-W_2)+\cos(W_3-W_1)\}-\cos x\{\sin(W_4-W_2)-\sin(W_3-W_1)\}]$
    ⓑ focusing (noise) signal F
(formula 107)
    $F=-2abt_1t_2(t_1^2+t_2^2)\sin P[\sin x\{\cos(W_4-W_2)-\cos(W_3-W_1)\}-\cos x\{\sin(W_4-W_2)-\sin(W_3-W_1)\}]$
    ⓒ upper and lower unbalance signal U
(formula 108)
    $U=2abt_1t_2(t_1^2+t_2^2)\sin P[\cos x\{\cos(W_4-W_2)-\cos(W_3-W_1)\}+\sin x\{\sin(W_4-W_2)-\sin(W_3-W_1)\}]$
    ⓓ MO (noise) signal MO
(formula 109)
    $M=-2abt_1t_2(t_2^2-t_1^2)\sin P[\sin x\{\cos(W_4-W_2)-\cos(W_3-W_1)\}-\cos x\{\sin(W_4-W_2)-\sin(W_3-W_1)\}]$ Based on the results mentioned above, the classified aberration groups are shown in table 1 below.

TABLE 1

| | Aberration of even function with respect to axes x and y. SA, DF, AS1 | Aberration of even function and odd fuction with respect to axes x and y, respectively. Y-COMA | Aberration of odd function and even function with respect to axes x and y, respectively. Y-COMA | UPPER: Structural Birefringence LOWER: Structural Bichroism Aberration of odd function with respect to axes x and y. AS2 |
|---|---|---|---|---|
| Left and Right unbalance Signal (Tracking Signal) $I_1 + I_2 - I_3 - I_4$ | $-8abcos\delta sinPsinx$ $-4abt_1t_2(t_1^2 + t_2^2)sinPsinx$ | $-8abcos\delta sinPsinx$ $-4abt_1t_2(t_1^2 + t_2^2)sinPsinx$ | $-8abcos\delta sinPsin(x + 2W)$ $-4abt_1t_2(t_1^2 + t_2^2)sinPsin(x + 2W)$ | $-8abcos\delta sinPcos2Wsinx$ $-4abt_1t_2(t_1^2 + t_2^2)sinPcos2Wsinx$ |
| 45° Unbalance Signal (Focus Signal obtained by the Astigmatism method) $I_1 - I_2 - I_3 + I_4$ | 0 0 | 0 0 | 0 0 | $8abcos\delta sinPsin2Wcosx$ $4abt_1t_2(t_1^2 + t_2^2)sinPsin2Wcosx$ |
| Upper and Lower Unbalance Signal $I_1 - I_2 + I_3 - I_4$ | 0 0 | 0 0 | 0 0 | $8abcos\delta cosPsin2Wsinx$ $4abt_1t_2(t_1^2 + t_2^2)cosPsin2Wsinx$ |
| MO sensor signal (Crosstalk Signal) $I_{45X} - I_{45Y}$ | 0 0 | 0 0 | 0 0 | $8absin\delta cosPsin2Wcosx$ $4abt_1t_2(t_2^2 - t_1^2)sinPsin2Wcosx$ | wherein a: amplitude diffraction efficiency of 0-order term of the diffracted light b: amplitude diffraction efficiency of ±1st orderterms of the diffracted light P: phase difference between 0-order term of the diffracted light and ±1st order diffracted light W: wavefront aberration δ: retardance of birefringence (rad)

x: incident position (rad)

$t_1$, $t_2$: amplitude transmittance in the main and sub directions

Embodiments of the present invention based on the above mentioned analysis will be discussed below, with reference to FIGS. 1 through 7 and Table 1.

In the embodiment illustrated in FIG. 1, the return light incident upon the MO sensors 25 and 27 are subjected to a birefringence (δ, $t_1$, $t_2$) by the objective lens 15 and include a wavefront aberration W. Accordingly, the return light is shifted by:

OS=8absinδ cosPsin2Wcosx or

OS=$4abt_1t_2(t_2^2-t_1^2)$sinPsin2Wcosx wherein the coefficients a, b and P are fixed and constant values that are determined in accordance with the shape of the magneto-optic disc 17, etc. Consequently, when cosx=0, i.e., x=±π/2, offset signal OS is zero, regardless of the birefringence (δ, $t_1$, $t_2$) or the wavefront aberration W.

To this end, in the present invention, data is recorded at a position deviated or shifted by π/2 or −π/2 from the center of the width of the recording tracks 18 (i.e., ¼ of the pit width from the center of the data recording position).

In a regular recording, data is recorded on an inner portion or an outer portion of the center of the recording track 18. In a double track recording method in which two signals are recorded on one pit, data is recorded on both the inner portion and the outer portion.

If data is recorded at positions of x=0 and x=π in the double track recording method, the laser beams are incident upon the positions of x=0 and x=π, and the different offset signals OS depending on the incident points are subtracted from the MO signals M. Namely, the modified MO signals M' obtained are represented by:

M'=$S_1-S_2$−OS=M−OS

45° Unbalance Signal:

When a 4-way split sensor, for example, having four detection areas that are divided by orthogonal axes in the diameter direction and a direction perpendicular thereto is used to obtain the MO signals M, the detection signals of the detection areas that are diagonally opposed to each other produce unbalance signals (45° unbalance signals) represented by the following equation:

Q=8abcosδ sinPsin2WcosX or

Q=$4abt_1t_2(t_1^2+t_2^2)$sinPsin2Wcosx

Note that the 45° unbalance signal Q is identical in phase to the noise signal inputted to the split sensors.

Therefore, the crosstalk can be cancelled by combining the 45° unbalance signal Q and the MO signal M as follows:

M'=M−kQ wherein k designates a coefficient which can be appropriately selected (e.g., k=tanP/tanδ).

Figure 4:
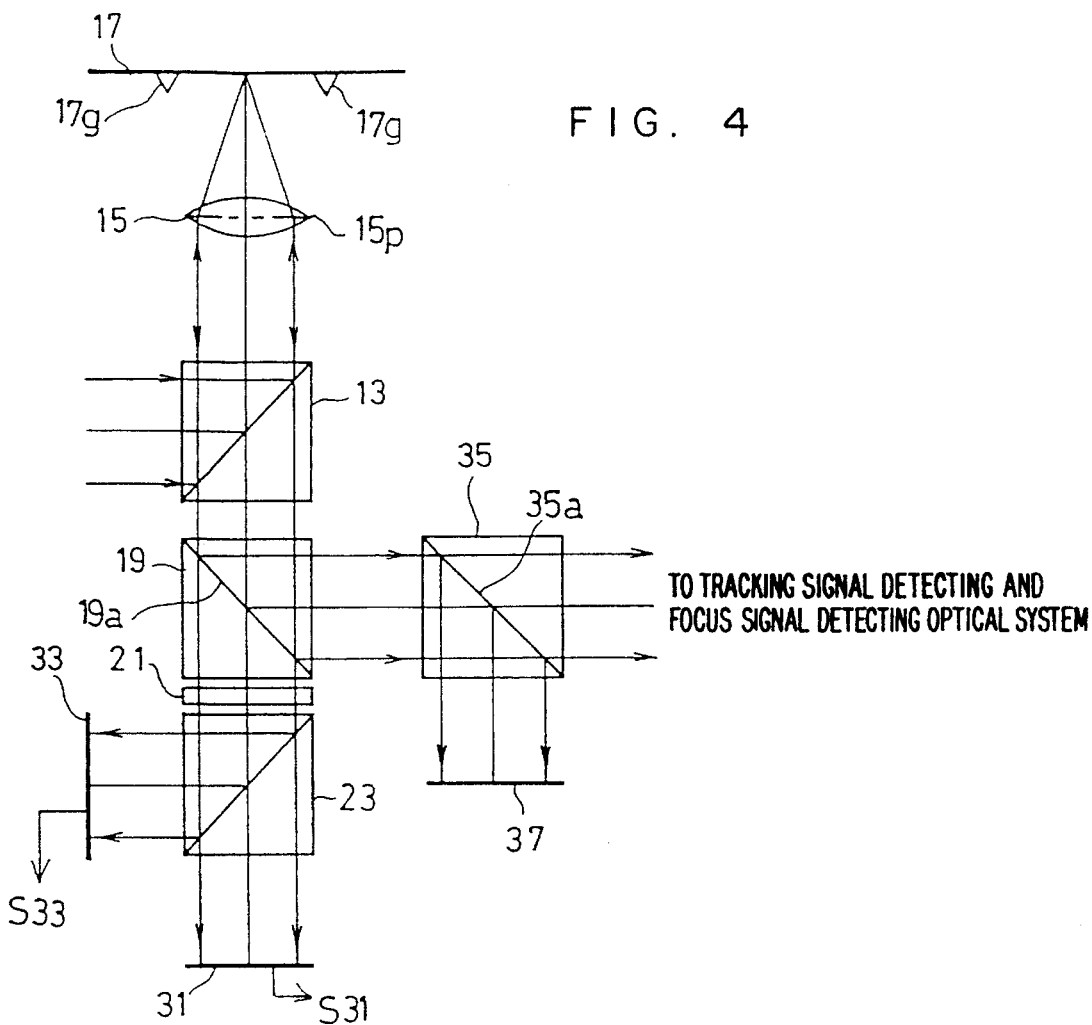
FIG. 4 is a schematic diagram of optical paths in an optical system of a magneto-optic disc apparatus, according to a second embodiment of the present invention.

FIG. 4 shows a second embodiment of an optical system having split sensors according to the present invention.

In FIG. 4, the elements corresponding to those shown in FIG. 1 are designated with like reference numerals and no detailed explanation therefor will be given herein.

Figure 5:
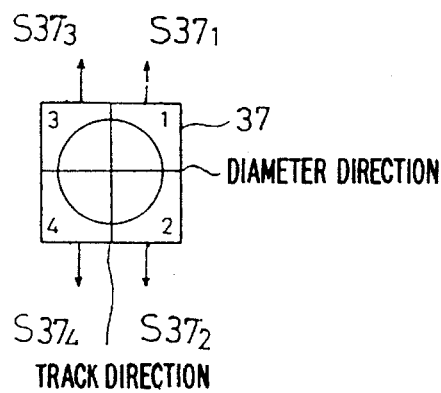
FIG. 5 is a schematic view of a photosensor in the second embodiment shown in FIG. 4.

The return light reflected by the magneto-optic disc 17 and by the second beam splitter 19 is split by the fourth beam splitter 35. The light transmitted through the fourth beam splitter 35 is received by a tracking signal and focusing signal detecting optical systems (not shown). The split light reflected by the reflecting/transmitting surface 35a of the fourth beam splitter 35 is made incident upon the third photosensor 37. As can be seen in FIG. 5, the third photosensor 37 is a 4-way split sensor having four detection areas (sensor elements) 371 through 374 which are divided by orthogonal axes in the diameter direction (horizontal direction in FIG. 5) of the magneto-optic disc and the track direction (vertical direction in FIG. 5) perpendicular thereto.

The sensor elements $37_1$ through $37_4$ generate detection signals $S37_1$ through $S37_4$, respectively.

In the first embodiment, the 45° unbalance signal Q can be obtained by the following equation:

$$Q=(S37_1+S37_4)-(S37_2+S37_3)$$

The noiseless MO signal M' can be obtained by subtracting the 45° unbalance signal Q which is multiplied by an appropriate coefficient k, from the MO signal M. Namely:

$$M'=S31-S33-kQ$$

wherein k is identical, for example, to (tanδ/tanP).

Figure 6:
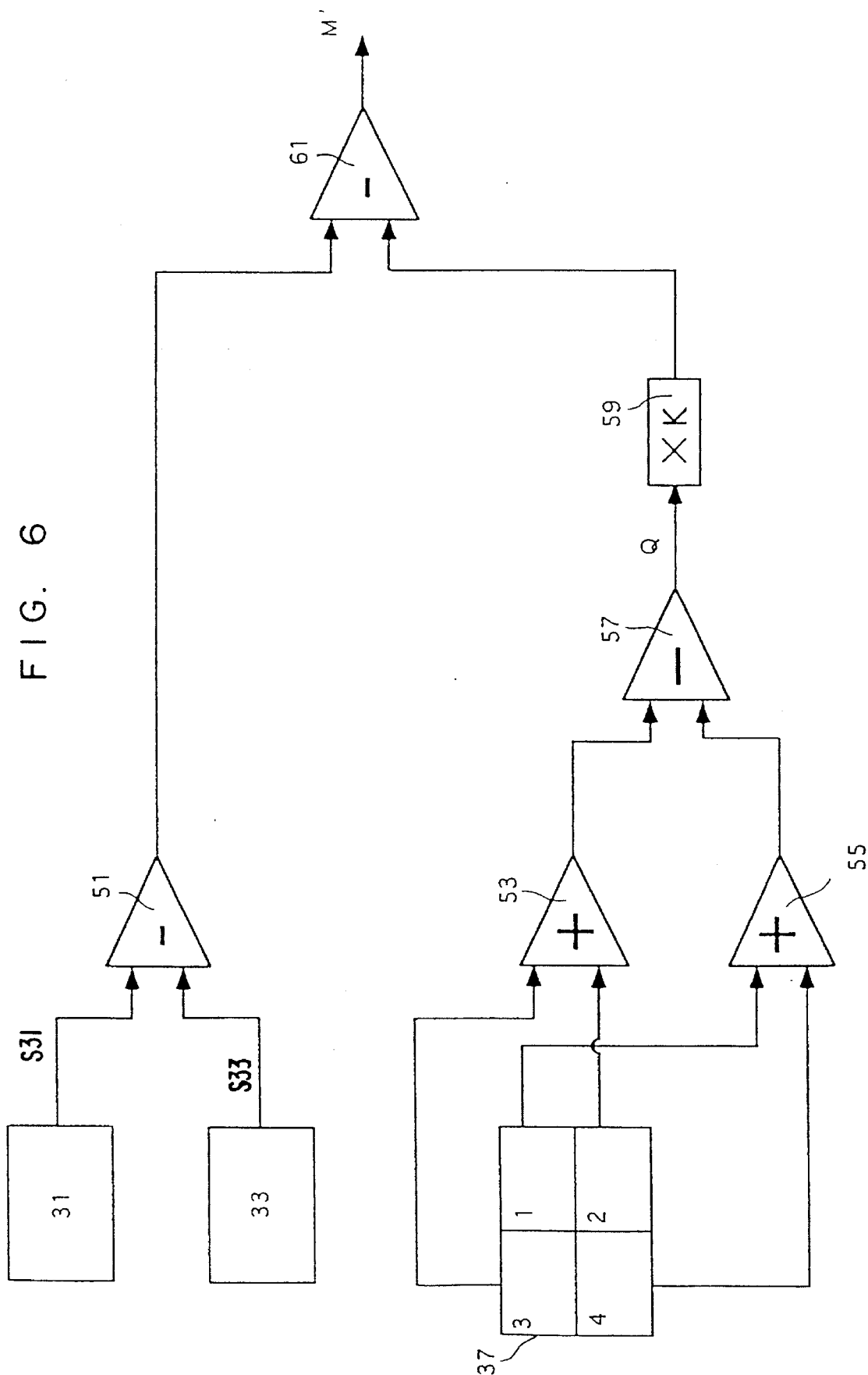
FIG. 6 is a block diagram of a signal processing circuit to obtain MO signals M' by way of example.

The MO signal M' is processed by the signal processing circuit shown in FIG. 6. A difference (S31–S33=M) in the output between the detection signals S31 and S33 of the sensors 31 and 33 to obtain the regular MO signal M is calculated by a subtracter 51. The difference Q in the output between the diagonally opposed detection areas of the split sensor 37 is obtained through the adders 53 and 55 and the subtracter 57. The difference $Q=(S37_1+S37_4)-(S37_2+S37_3)$ thus obtained is multiplied by k through the multiplier 59. Thereafter, the difference between (S31–S33) and [k{$(S37_1+S37_4)-(S37_2+S37_3)$}] is calculated to obtain the correct MO signal M'. Namely, $$M'=(S31-S33)-[k\{(S37_1+S37_4)-(S37_2+S37_3)\}]=S31-S33-kQ$$

Figure 7:
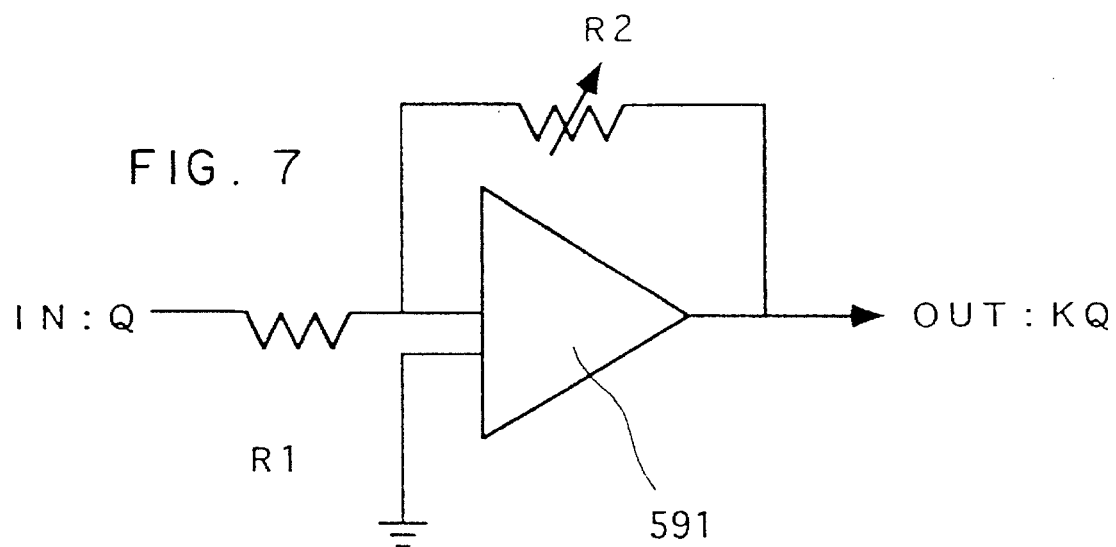
FIG. 7 is a circuit diagram of an analogue circuit of multiplication of a coefficient k in the signal processing circuit shown in FIG. 6.

The multiplier 59, which defines the coefficient k, is comprised of an analog circuit using, for example, an operation amplifier 591, as shown in FIG. 7. In the illustrated embodiment, the value of the coefficient k can be adjusted by changing the resistance of the variable resistor R2.

Figure 8:
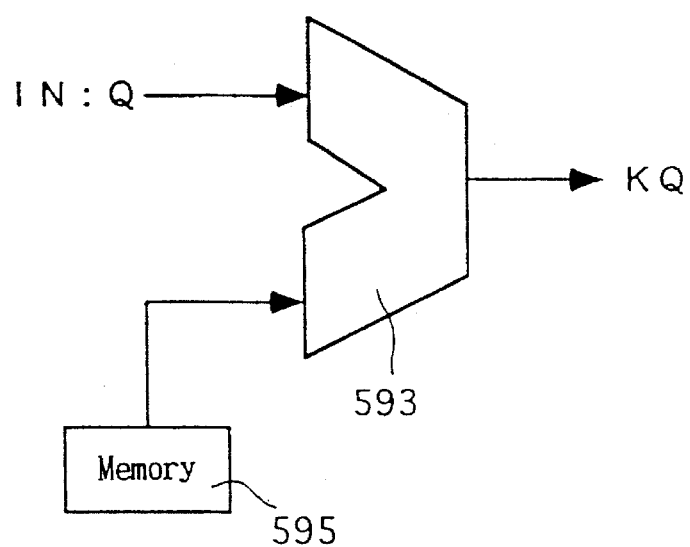
FIG. 8 is a circuit diagram of a digital circuit of multiplication of a coefficient k in the signal processing circuit shown in FIG. 6.

Alternatively, the calculating circuit 59 can be comprised of a digital circuit, as shown in FIG. 8 in which the coefficient k is stored in a ROM 595 and is read therefrom upon calculation through the multiplier circuit 593.

The optimum coefficient k is specifically determined depending on the magneto-optic disc apparatus. Namely, the coefficient k varies depending on the kind of the magneto-optic disc apparatus. The coefficient k is set as follows:

The optical head is moved across two or more tracks 18 on which no MO signal has been recorded. The coefficient k is selected such that the amplitude of the MO signal (i.e., the crosstalk signal) in the form of a sine wave which is produced during the movement of the optical head is zero. This selection can be affected by adjusting the resistance of the variable resistor in case of the analog circuit and by changing the value of the coefficient k to be stored in the ROM in case of the digital circuit. Thus, the crosstalk can be made zero by the selection of the coefficient k.

Figures 10A, 10B:
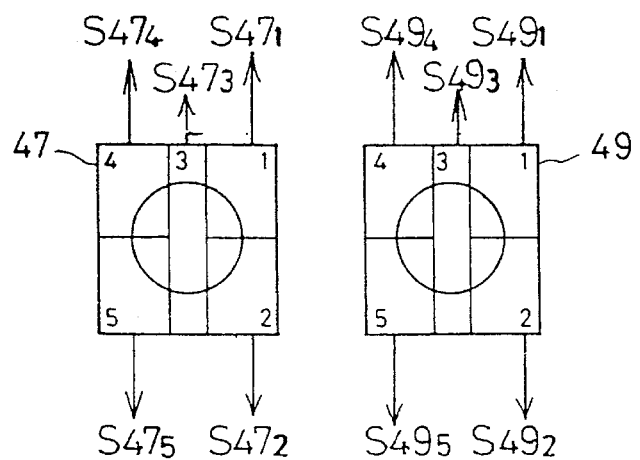
FIG. 10(A) and 10(B) show photosensors used in the optical system shown in FIG. 9.

FIG. 9 shows another embodiment of the present invention, in which the MO sensors are made of sensors 47 and 49, each having five split detection areas (detecting elements) to obtain the focus signals and the track signals. As can be seen in FIGS. 10(A) and 10(B), each of the five-split sensors 47 and 49 include one center area (sensor element) $47_3$ (or $49_3$) extending along the center axis thereof, and four other (right, left, upper and lower) split areas (sensor elements) $47_1, 47_2, 47_4$, and $47_5$ (or $49_1, 49_2, 49_4$, and $49_5$) that are located on opposed sides of the center area and split by the two orthogonal lines passing through the center of the sensor in the horizontal and vertical directions in FIGS. 10(A) and 10(B). The tracking signal T, the focusing signal F, the 45° unbalance signal Q, and the MO signal M can be obtained at one time by the use of the 5-way split sensors 47 and 49. Note that the tracking signal T can be obtained by a push-pull method and the focusing signal F can be obtained by a spot-size method.

The tracking signal T, the focusing signal F, the 45° unbalance signal Q, and the MO signal M are respectively defined by the following equations.

$$T=(S47_1+S47_2+S49_1+S49_2)-(S47_5+S47_2+S49_4+S49_5)$$

$$F=(S47_1+S47_2+S47_4+S47_5-S47_3)-(S49_1+S49_2+S49_4+S49_5-S49_3)$$

$$Q=(S47_1+S47_5-S47_2-S47_4)-(S49_2+S49_4-S49_1-S49_5)$$

$$M=(S47_1+S47_2+S47_3+S47_4-S47_5)-(S49_1+S49_2+S49_3+S49_4+S49_5)$$

$$M'=M-kQ$$

Wherein M designates the MO signal before correction and M' the MO signal after correction. As mentioned above, the crosstalk can be effectively eliminated by appropriately selecting the coefficient k.

Figure 3A:
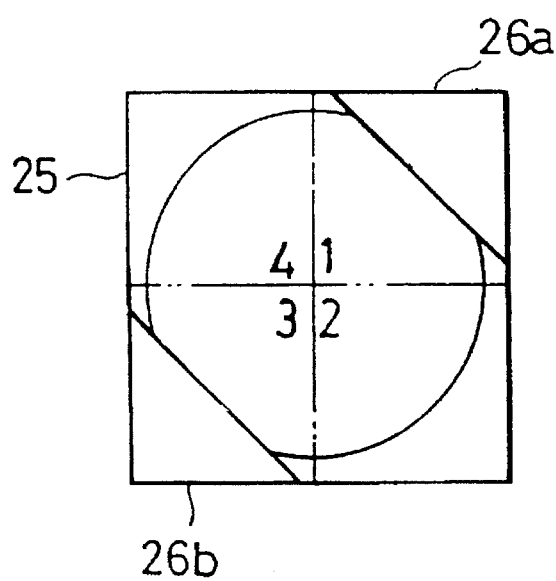
FIG. 3(A) and 3(B) show an example of a photosensor in different light intercepting positions.
Figure 3B:
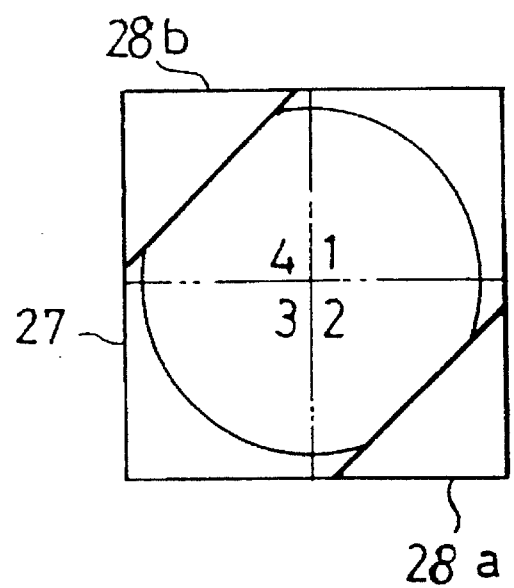

Although the above discussion has been directed to the split sensors, the crosstalk can be eliminated without using split sensors. In the first embodiment illustrated in FIG. 1, crosstalk can be eliminated by closing the light receiving areas of the sensors 25 and 27 with masks to thereby restrict the quantity of light to be received thereby. The first MO sensor 25 is partially closed at the diagonally opposed corner portions (45° and −135° directions) thereof by the light intercepting plates 26a and 26b, as shown in FIG. 3(A). Similarly, the second MO sensor 27 is partially closed at the diagonally opposed corner portions (+135° and −45° directions) thereof by the light intercepting plates 28a and 28b as shown in FIG. 3(B). The quantity of light to be intercepted by the light intercepting plates 26a and 26b or 28a and 28b is determined depending on the magneto-optic disc apparatus, similarly to the selection of the coefficient k.

As can be understood from the foregoing, the present invention is completely based on the inventor's analysis that the phase of the unbalance signals in the diagonal directions of the sensors have the same phase as the noise signals mixed with the detection signals thereof. In the present invention, the structure of the MO sensors is not limited to the illustrated embodiments, so long as alternatives are based on the inventor's analysis. In summary, the crosstalk can be cancelled by combining the MO signal M and the 45° unbalance signal Q which is multiplied by a predetermined coefficient.

According to the present invention, the light reflected by the recording track of the magneto-optic disc is split into a plurality of split beams, one of which is received by a split sensor, so that recorded signals are detected based on a difference between signals from a split sensor output (adjusted by a predetermined multiplication coefficient) and a detection signal of other sensors which received the split beam. Thus, recorded signals with no crosstalk can be produced.

I claim:

1. A magneto-optic disc apparatus in which detecting light is reflected by the recording track of a magneto-optic disc and split into at least two split beams which are received by respective sensors to detect signals recorded on the recording track, comprising:

three beam splitters that split said reflected light into at least a total of four split beams;

a split sensor that receives one of said four split beams, said split sensor comprising four split sensor areas which are divided by orthogonal axes in a diameter direction of said magneto-optic disc and in a track direction perpendicular to said diameter direction;

a calculator that multiples a predetermined difference signal from a plurality of detection signals outputted from said split sensor by a predetermined coefficient; and a signal detector that detects a recorded signal in accordance with said difference signal which has been multiplied by said coefficient and said detection signals of said split sensor;

said calculator calculating an unbalanced signal Q between diagonally opposed sensor areas of said split sensor in accordance with the following equation:

$$Q=(S37_1+S37_4)-(S37_2+S37_3),$$

where $S37_1$ and $S37_2$ comprise detection signals of a first diagonally opposed sensor area pair of said split sensor, and $S37_3$ and $S37_4$ comprise detection signals of a second diagonally opposed sensor pair of said split sensor, and said calculator multiplying said value of Q thus obtained by a predetermined coefficient k, so that said signal detecting means obtains a recorded signal based on the following equation:

$$(S31-S33)-kQ$$

where S31 and S33 comprise detection signals of a second and a third split sensor that receive other beams of said four split beams.

2. A magneto-optic disc apparatus according to claim 1, wherein at least two of said four split beams are received by said second and third split sensors.

3. A mageto-optics disc apparatus according to claim 2, wherein said two other split beams are separated by a polarization beam splitter.

4. A magneto-optic disc apparatus according to claim 1, wherein said difference signal represents a difference between a sum of output signals of two diagonally opposed sensor areas of said split sensor and a sum of output signals of two other diagonally opposed sensor areas of said split sensor.

5. A magneto-optic disc apparatus according to claim 1, wherein said coefficient k is selected such that when said detecting light moves in a transverse direction across more than one track on which no data is recorded, a resultant amplitude of said detected detection signal is zero.

6. A magneto-optic disc apparatus according to claim 1, wherein data is recorded on said recording track at a position plus and minus ¼ of a track width perpendicular to a tracking direction from a center of said track.

7. A magneto-optic disc apparatus in which detecting light is reflected by a recording track of a magneto-optic disc and split into at least three split beams which are received by separate sensors to detect signals recorded on said recording track, comprising:

a 4-way split sensor which receives one of said at least three split beams, said 4-way split sensor comprising four split sensor areas which are divided by orthogonal axes in a diameter direction of said magneto-optic disc and in a track direction perpendicular to said diameter direction;

two sensors which receive remaining split beams of said at least three split beams, respectively;

calculating means for multiplying a difference signal outputted from said 4-way split sensor by a predetermined coefficient; and signal detecting means for detecting a recorded signal in accordance with said difference signal which has been multiplied with said predetermined coefficient and detection signals of said sensors;

said calculating means calculating an unbalance signal Q between diagonally opposed sensor areas of said split sensor in accordance with the following equation:

$$Q=(S37_1+S37_4)-(S37_2+S37_3),$$

where $S37_1$ and $S37_2$ comprise detection signals of a first diagonally opposed sensor area pair of said split sensor, and $S37_3$ and $S37_4$ comprise detection signals of a second diagonally opposed sensor pair of said split sensor, and said calculating means multiplying said value of Q thus obtained by a predetermined coefficient k, so that said signal detecting means obtains a recorded signal based on the following equation:

$$(S31-S33)-kQ,$$

where S31 and S33 comprise detection signals of said two sensors.

8. A magneto-optic disc apparatus in which detecting light is reflected by a recording track of a magneto-optic disc and split by a beam splitter into at least two split beams received by at least two sensors to detect signals recorded on said recording track in accordance with detection signals of said sensors, comprising:

a pair of five-split sensors, each having one center sensor area extending in a track direction corresponding to a tangential direction of said magneto-optic disc spin axis and four peripheral sensor areas that are located on opposed sides of said center sensor area and split by orthogonal axes in a diameter direction and in said track direction perpendicular to said diameter direction;

calculating means for multiplying a predetermined difference signal of a plurality of detection signals outputted from said five-split sensors by a predetermined coefficient; and signal detecting means for detecting a recorded signal in accordance with said difference signal which has been multiplied by said coefficient and said detection signals of said five-split sensors;

said calculating means calculating an unbalance signal Q in a diagonal direction of said five-split sensors in accordance with the following equation:

$$Q=(S47_1+S47_5-S47_2-S47_4)-(S49_2+S49_4-S49_1-S49_5)$$

where $S47_1$, $S47_2$, $S47_4$ and $S47_5$, and $S49_1$, $S49_2$, $S49_4$ and $S49_5$ are output signals, respectively, of said peripheral sensor areas of said pair of five-split sensors, and said calculating means further calculating a recorded signal M in accordance with the following equation:

$$M=(S47_1+S47_2+S47_3+S47_4-S47_5)-(S49_1+S49_2+S49_3+S49_4+S_5)$$

where $S47_3$ and $S49_3$ are output signals, respectively, of said center sensor areas of said pair of five-split sensors, whereby said signal detecting means obtains a corrected recorded signal M' based on the following equation:

$$M'=M-kQ,$$

where k is a predetermined coefficient.

9. A magneto-optic disc apparatus according to claim 8, wherein said two split beams are separated by a polarization beam splitter.

10. A magneto-optic disc apparatus according to claim 1, further comprising light intercepting members which intercept a predetermined quantity of light to be received by light receiving surfaces of said second and third split sensors at diagonally opposed portions thereof.

11. A magneto-optic disc apparatus according to claim 10, wherein said light receiving surfaces of said sensors are of a generally square shape having two pairs of opposed sides parallel with said diameter direction of said magneto-optic disc in a direction perpendicular to a tangential direction of said magneto-optic disc spin axis, so that said light intercepting members intercept light incident upon said corner portions of said sensors.

12. A magneto-optic disc apparatus according to claim 10, wherein said sensors are intercepted at different diagonally opposed corner portions by respective light intercepting plates.

13. A magneto-optic disc apparatus according to claim 7, wherein said coefficient k is selected such that when said detecting light moves in a transverse direction across more than one track in which no data is recorded, a resultant amplitude of said detected detection signal is zero.

14. A magneto-optic disc apparatus according to claim 7, wherein data is recorded on said recording track at a position plus and minus ¼ of a track width perpendicular to a tracking direction from a center of said track.

* * * * *

UNITED STATES PATENT AND TRADEMARK OFFICE
CERTIFICATE OF CORRECTION

PATENT NO.    : 5,535,179
DATED         : July 9, 1996
INVENTOR(S)   : Masato NOGUCHI It is certified that error appears in the above-indentified patent and that said Letters Patent is hereby corrected as shown below:

At column 23, line 31 (claim 3, line 1), change "mageto" to ---magneto---.

At column 23, line 31 (claim 3, line 1), change "-optics" to --- -optic---.

At column 23, line 32 (claim 3, line 2), before "two" insert ---at least---.

At column 24, line 57 (claim 8, line 31), change "+$S_5$" to ---+$S49_5$---.

Signed and Sealed this

Third Day of June, 1997

BRUCE LEHMAN

*Attest:*

*Attesting Officer*   Commissioner of Patents and Trademarks